Feb. 14, 1967 J. RABINOW 3,304,412

VEHICLE READING SYSTEM USING INBOARD LIGHT

Filed Jan. 29, 1963

INVENTOR

Jacob Rabinow

BY Joseph A. Genovese & Max L. Libman

ATTORNEYS 3,304,412
Patented Feb. 14, 1967

3,304,412

VEHICLE READING SYSTEM USING INBOARD LIGHT

Jacob Rabinow, Bethesda, Md., assignor, by mesne assignments, to Control Data Corporation, Minneapolis, Minn., a corporation of Minnesota Filed Jan. 29, 1963, Ser. No. 254,689
11 Claims. (Cl. 235—61.11)

This invention relates to data systems and particularly those associated with vehicular traffic.

Vehicle traffic control has presented problems almost from the time that transportation vehicles have been motor-operated. Since the problems are, perhaps, more acute in rail transportation, my present invention is described in connection with railway vehicles. However, it is understood that my invention applies to other vehicles as well.

Many early patents disclose mechanical, electromechanical and electrical devices to identify railway cars, their destination, cargo, etc. As technology progressed, innovations were applied to the railway traffic control problem. For example, photographic, high frequency electromagnetic, radar, magnetic and optical systems have been proposed. Many have been constructed, at least on a laboratory scale, and tested under field conditions. My present invention is concerned with optical reading systems for extracting information from a moving vehicle.

An optical system which becomes evident with a knowledge of the optical mark-sensing field, is a wayside mark-sensing machine to optically read bar codes on the sides of vehicles. A serious drawback of the bar code system is that it must rely on reflected light for reading, and this is a source of major difficulty. In normal use, a railway car becomes very dirty so that the light reflectance from both the code bars and their background varies. Furthermore, there is no way to predict the percentage variation of the reflectance of the code bars with respect to their background. U.S. Patent No. 3,277,283 discloses an improvement using a vehicle mounted panel having apertures arranged to establish codes. The theory is that an aperture is incapable of reflecting any light, and no matter how dirty the surface of the panel becomes, it will reflect some light to the reading machine. Thus, although there is a variation in signal to noise in the patented system, some signal will always be available due to the failure of the code-apertures to reflect any light at all. With one of the possible light-reflectance variables fixed, i.e., the code information holes whose reflectance is always zero, the background area (the surface of the panel) is the only source of possible variation of light reflectance. This is an improvement over a code device on a vehicle where dirt accumulations will non-uniformly effect both the information subareas and the background area.

As a variation of the apertured panel code system for vehicular traffic, D. A. Riggin (U.S. Ser. No. 203,780) suggests that better results may be obtainable by relying on transmitted light, i.e., light transconducted through apertures in a panel that disclosed in Patent No. 3,277,283. In working with a machine like that disclosed in Patent No. 3,277,283 code-aperture detection machine (henceforth called Reading Machine or Optical Sensing Device) D. A. Riggin noted that even though the code apertures reflect no light, the wide variation in reflectance of the background area (face of the code panel) causes considerable difficulty in the reading machine as follows. The face of the panel on a vehicle could, for example, be white, gray or even black, although when it is originally installed on the rail car, it is white or light metallic. Thus, even with one of the two possible variables fixed (reflectance of the code information and reflectance of the background area) precise electronic equipment had to be used in the reading machine, otherwise, the photomultiplier amplifiers thereof saturated or failed to respond over the wide operating range. This was not an insurmountable difficulty, but the cost of the reading machine somewhat exceeded expectations.

Accordingly, the D. A. Riggin application, Ser. No. 203,780 discloses an arrangement where the background area of an apertured code panel provides no reflectance, while the code apertures provide very bright light sources. This is accomplished by back-lighting panel so that the background area of the image of the panel which is "seen" by the reading machine optical system is dark (because the panel acts as a mask), while the light passing through the code apertures appears bright to the reading machine. In effect, the Riggin system does not rely on reflectance of the panel, and therefore his system is independent of any dust, dirt, etc. which may accumulate on the code panel. Thus, the wide variation in signal to noise inherent in the system disclosed in Patent No. 3,277,283 is not present in the Riggin system.

As is often the case, the solution to a given problem often introduces other problems. It is most difficult to install a lighting system for back-lighting code panels attached to railway cars (or other vehicles) if one of the requirements is that the source of illumination cannot be mounted on the vehicle. The prohibition of vehicle-mounted lighting is based on economic considerations. The cost would be too high for commercial acceptance. Thus, restricted to wayside lighting, the panel-illumination problem is formidable because there are very few places on a rail car where a panel can be mounted so that the source of illumination can be located on one side of the track, the reading machine on the other, and have the panel on the vehicle intercept the light path without obstruction from parts of the rail car. Furthermore, the panels of the cars must be mounted at a substantially uniform height from a horizontal reference, for example, the surface of the tracks. One vehicle location that only reasonably well fulfills the above requirements is on the coupler at the front or back of the rail car. But locating a code panel on the coupler is objectionable because of the abuse that it will receive, possible interference with pressure lines, etc.

After a study of numerous rail car designs and configurations, I discovered that it is possible to back-light a code panel of a railway vehicle by locating a light source near one rail of the track and having it directed outwardly and upwardly at an angle to a horizontal plane (assuming the track to be horizontal). This is possible because the portions of bodies of rail cars located outboard of the track have a certain amount of ground-clearance, and they project outboard of the track only a specified maximum distance on both sides of the track.

Accordingly, by attaching the code panel to a part of the vehicle structure outboard of the track, in a manner that the panel will intercept the above defined angled light path as the car moves on its track, my invention overcomes the most serious problem of the back-lighted system described in application Ser. No. 203,780. Although various specific parts of the vehicle structure can be used as the support for my back-lighted code panel, an excellent part of the vehicle structure is the journal box or its cover because journal boxes are approximately of uniform height and they are not subjected to the large sway amplitudes of the car bodies. The journal boxes and their covers are in what I consider to be a critical area, i.e., outboard of the adjacent track rail, above the plane of the track surface, and inboard of the outer surface of the car body.

An object of my invention is to provide a vehicle reading system using light transconducted through code apertures in a panel (or the equivalent) which is mounted on a vehicle in a manner to intercept an optical path between a wayside reading machine and a light source on the same side of the centerline of the track as the reading machine.

Another object of my invention is to provide a reading system for the vehicles which overcomes many of the difficulties encountered in prior optical systems used for vehicular traffic control in transportation systems.

Other objects and features will become apparent in following the description of the illustrated forms of the invention which are given by way of example only.

Figure 4:
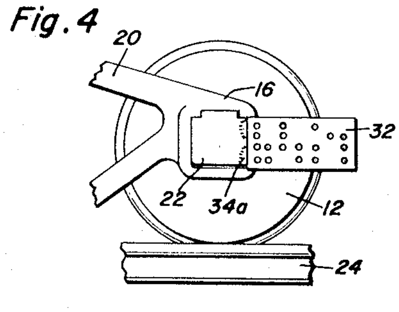

FIGURE 4 in an elevational view showing an alternate position for the mounting of a code panel.

Figure 1:
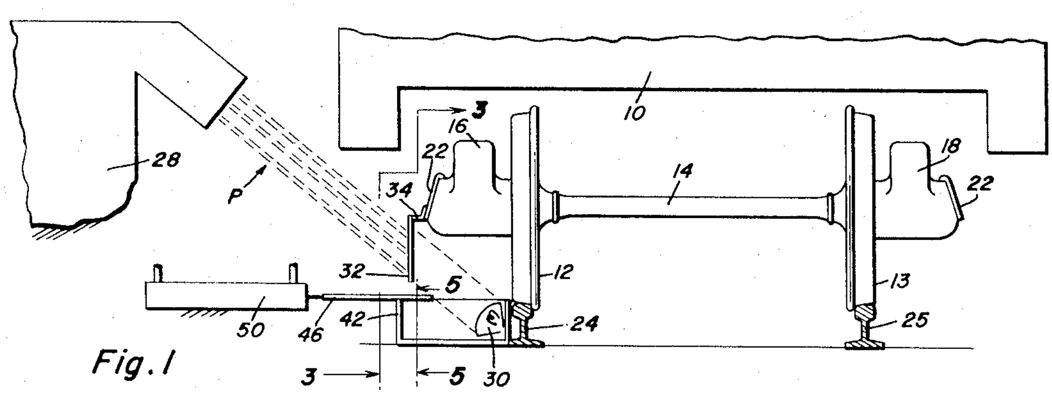
FIGURE 1 is a fragmentary end view schematically showing a typical rail vehicle on a track and also showing my reading system being used in connection therewith.
Figure 5:
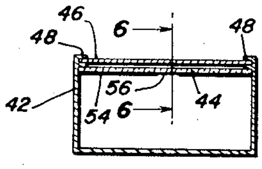

FIGURE 5 is an enlarged sectional view taken on line 5—5 of FIGURE 1 and showing a special ground box for the protection of the light source in my system.

Figure 6:
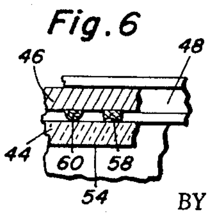

FIGURE 6 is an enlarged fragmentary sectional view taken on line 6—6 of FIGURE 5 and showing cleaning devices for the light transmissive panel of the ground box.

Figure 7:
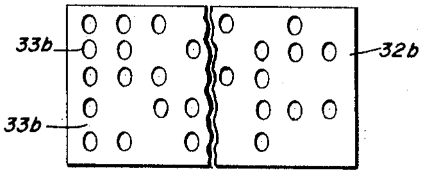

FIGURE 7 is a front view of a modification of my panel.

Figures 2, 3, 8:
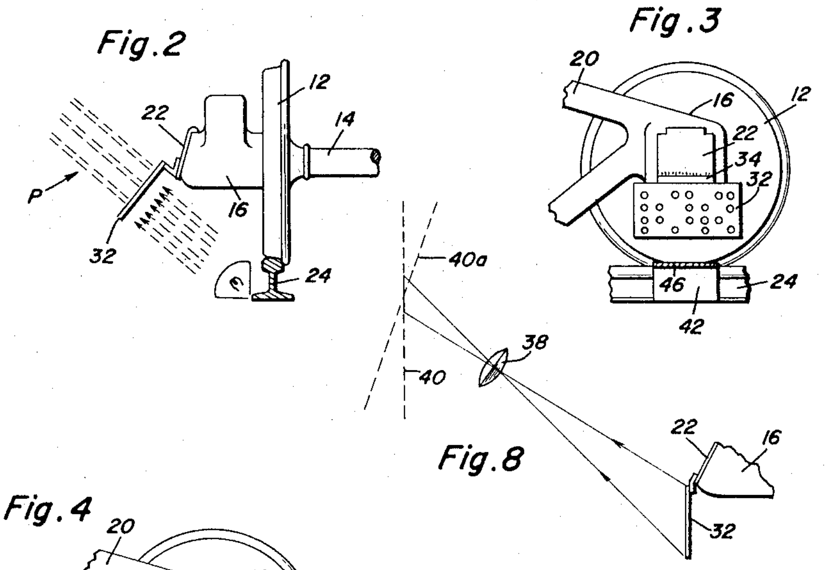
FIGURE 2 is a fragmentary elevational view showing a modification where the code panel is mounted in such manner that it is perpendicular to the light rays instead of oblique thereto as in FIGURE 1.
FIGURE 3 is a sectional view taken on line 3—3 of FIGURE 1.

FIGURE 8 is a diagrammatic view showing a part of the optical system of my invention.

FIGURE 1 shows the end of a vehicle having body 10, wheels 12, 13 and a wheel-connecting axle 14. The ends of axle 14 are mounted in journals (not shown) within journal boxes 16, 18 and these are supported by side frames 20 (shown only in FIGURES 3 and 4) in the usual manner. Each journal box has a cover 22, and it is immaterial whether the cover is hinged (shown) or mounted in another way.

The relationship of the vehicle to its supporting rails 24, 25 of the track is important. There are some variables in this relationship but other design factors are fixed. For instance, in this country the gauge of the track is fixed. There is a maximum width dimension for rail cars and hence, there is a maximum overhang of the car bodies on the outboard sides of the rails of the track. There is a minimum ground clearance requirement, and the large majority of rail car wheels have a radius which varies within only a few inch range. These considerations plus an examination of the design of numerous existing cars led me to the discovery that an optical path could be established between a wayside reading machine as at 28, and light source 30 located inboard of the adjacent side of the car and at a level below the axis of the car wheels. Thus, the optical path P passes beneath the outboard overhang portion of the car and at an angle to the plane of the track rails 24, 25. All cars, of which I am aware, have no appendages or structures that will interfere with the optical path P arranged in this manner at some point along the length of the vehicle. Many boxcars, for example, have ladders with one or more steps at the two ends of the cars which would interfere with optical path P, but between the ladders this area is clear.

Code panel 32 can be constructed with apertures 33 like the code panels described in Patent No. 3,277,283 and/or in the Riggin application. Those panels are, for the most part, metal plates will vertical columns of code-apertures where each column defines a character. The reading machines in the above patent and application are designed to sense the codes and identify the characters. Thus, my reading machine 28 can be constructed along the lines of any of the machines disclosed therein. For the purpose of my present invention, therefore, reading machine 28 can be considered conventional except for the feature of optics shown in FIGURE 8 and described later.

Panel 32 can be mounted vertically (FIGURE 1) or at an angle (FIGURE 2) to a vertical plane so that the light path P is intercepted at right angles. Regardless of the angularity of panel 32, it is mounted outboard of one of the rails of the track on a convenient part of the vehicle structure in a manner that its lower edge is above the surface of the track and horizontally, it is located between the adjacent track rail and the adjacent side of the vehicle. A convenient part of the vehicle to support panel 32 is the journal box or its cover. A mounting bracket 34 which is either fixedly or adjustably (not shown) secured to the panel can be attached to the journal box or its cover (shown) by any conventional fastener or fastening technique such as by brazing or welding (illustrated). A shown in FIGURE 3 the panel 32 can be secured to the lower part of the journal box cover or as shown in FIGURE 4, panel 32 can be secured near a side edge of the journal box cover by brackets **34*a* so that the panel extends to the rear (or front) of the journal box. As far as my present system is concerned, the use of the journal box or its cover as the vehicle structure to support panel 32, is not critical. For instance, the panel can be secured to side frame 20, hangers attached to the car body 10**, or any available convenient structure outboard of the track as long as it will intercept light path P as the vehicle moves along the track.

It is probably easier to mount panels 32 in a vertical position as shown in FIGURE 1 and achieve uniform mounting in a vertical plane, and it will remain cleaner when so mounted. However, the lower edge portion of panel 32 will be slightly farther than the upper edge from the optical system of reading machine 28, but this can be compensated by having the apertures of each column graduated in size with the lower apertures slightly larger than the upper apertures. By selecting a wide-angle lens 38 (FIGURE 8) as a part of the optical system of reading machine 28, the image of vertical panel 32 will be formed in a vertical image plane 40 (within reading machine 28) even though the optical path is slanted as shown. This is often done in architectural photography of tall buildings. Furthermore, it is always possible to slant the plane of the photocell detector, as shown at **40*a*, to keep the entire panel in focus. A minor difficulty in having panel 32 obliquely intercept the light path P is that round apertures will be seen as elipses in the image plane. Also, panel-thickness introduces a dimension which must be considered. These difficulties are sufficiently minor to be neglected. However, if desired, the apertures 33*b* of panel 32*b*** (FIGURE 7) can be corrected to solve the problem. The apertures are slightly elongate vertically so that when they are optically foreshortened, they will appear more uniformly circular, although there is no compelling reason for the apertures to be circular in the first instance. They can be other shapes as rectangular, square, etc.

FIGURES 1, 5 and 6 show details of ground box 42 containing light source 30. The ground box is a weather tight container having a transparent panel 44, e.g., glass secured near the open top thereof. Sliding door 46 is located above transparent panel 44 and is constrained by guides 48 attached to the sides of the box. Suitable electrical, pneumatic, hydraulic, etc. means are used to slide the door 46 to an open position (FIGURE 1) when a vehicle approaches the reading station and close the door when the vehicle passes. Conventional advance signal devices which form no part of my present invention, can be used to cause the door to open. The door operator shown in FIGURE 1 is a fixed hydraulic or pneumatic cylinder 50 which has its piston rod connected to door 46.

Since each character (column of aperture) is read serially as the vehicle moves through the reading station, it is not necessary to illuminate much more than one or two vertical columns of apertures of panel 32 at a time. Accordingly, I can use a cylindrical lens in combination with light source 30, a cylindrical light source such as a fluorescent lamp, or I can use a prefocused or flood lamp together with a mask 54 (FIGURE 5) having a slot 56 therein. The mask 54 can be suitably constructed, e.g., painted on the glass panel 44, a slotted plate, etc.

To assure that the top surface of the panel 44 is clean at all times, I have means to wipe the outer surface of panel 44 each time that the door 46 is opened and closed. These means consist of a pad 58 of felt, a rubber squeegee 60, or any other equivalent cleaning device attached to door 46 and contacting the adjacent surface in the panel 44. Thus, each time that door 46 is operated window 44 is cleaned.

It is understood that various changes and modifications may be made without departing from the protection of the following claims.

I claim:

1. A vehicle data system for vehicles which operate on a track, where a typical vehicle has wheels on the track and a vehicle structure above the track surface and overhanging the area outboard on the track on both sides thereof, a code member with light-transconductive subareas defining the code, said member attached to a part of said structure to position said member above said area outboard of one of the track rails, a light source device and an optical sensing device in optical alignment with each other to establish an optical path therebetween, one device being lower than the other so that said path is inclined relative to said area, and the lower device located closely adjacent to said track and the other device farther away from the same track in an outboard direction with respect to said track, and the specific location of said member on the vehicle structure being predetermined with respect to said optical path to intercept the optical path as the vehicle moves on the track.

2. The subject matter of claim 1 wherein said code member is a flat panel which is mounted with its surfaces parallel to the direction of movement of the vehicle so that its surfaces face said devices during the time that said member intercepts said optical path.

3. In a track supported vehicle having structure which projects beyond both sides of the track and which is disposed above the track surface, a data system to extract information from the vehicle as it moves on the track, said data system including a panel provided with a plurality of data-defining openings, means mounting said panel on the vehicle in a position that the panel is outboard of one of the track rails and above the surface thereof, a light source device, and an optical sensing device, said devices being stationary and in optical alignment with each other, one device being outboard of said panel with the optical path between said devices intercepted by said panel as the vehicle moves on said track.

4. The subject matter of claim 3 wherein both of said devices are on the same side of the centerline of the track.

5. The subject matter of claim 3 wherein one said device is located adjacent to one rail and the other device is outboard thereof and at a higher elevation.

6. The subject matter of claim 3 wherein said optical path is inclined relative to a horizontal plane at approximately track level, and the plane of said panel intercepts said optical path at an oblique angle whereby the distances between different points of said panel and one of said devices are unequal, and compensating means in the code of said panel to compensate for the differences in said distances.

7. The subject matter of claim 6 wherein said compensating means are variations in the configurations of said data-defining openings.

8. The subject matter of claim 3 wherein said optical path between said dvices is at an angle to the plane of said track surface.

9. The subject matter of claim 8 wherein said panel is normal to said optical path.

10. The subject matter of claim 8 wherein said panel is substantially perpendicular to said plane of the track, and said optical sensing device has means to form an image of said panel in an image plane which is substantially parallel to said panel.

11. The subject matter of claim 3 and means operatively associated with said light source device for cleaning said light source device.

References Cited by the Examiner

UNITED STATES PATENTS 2,581,552 1/1952 O'Hagan ------------- 246—2

MAYNARD R. WILBUR, *Primary Examiner.*

MALCOLM A. MORRISON, *Examiner.*

P. J. HIRSCHKOP, R. E. COUNCIL, *Assistant Examiners.*